United States Patent Office 3,841,969
Patented Oct. 15, 1974

3,841,969
PREPARATION OF IMMOBILIZED ENZYMES
Anthony Nicholas Emery, Sidney Alan Barker, and Julio Maggioly Novais, Birmingham, England, assignors to Ranks Hovis McDougall Limited, London, England
No Drawing. Filed Feb. 3, 1972, Ser. No. 223,302
Claims priority, application Great Britain, Feb. 10, 1971, 4,373/71
Int. Cl. C07g 7/02
U.S. Cl. 195—63                                    26 Claims

ABSTRACT OF THE DISCLOSURE

A water insoluble enzyme is prepared by reacting at a pH of 3 to 7 an enzyme with a titanium, tin, zirconium or iron derivative of a polysaccharide or a derivative thereof, nylon or glass.

---

This invention is for improvements in or relating to enzymes and has particular reference to the modification of enzymes by attachment to water insoluble solid matrices, i.e. a polysaccharide or a derivative thereof, nylon or glass.

More particularly this invention relates to the water insolubilisation of enzymes by chemically attaching them to an insoluble polysaccharide or a derivative thereof, nylon or glass and has as an object the provision of enzyme preparations in a form where they can be reused repeatedly or used continuously, be more stable to heat than corresponding soluble enzymes, and be regenerated when enzymic activity has decreased.

It is an object of this invention to provide active water-insoluble preparations of enzymes chemically coupled with organo-metallic derivatives of a polysaccharide or a derivative thereof, nylon or glass.

The organo-metallic derivatives of the polysaccharide or a derivative thereof, nylon or glass may be obtained by reaction of said polysaccharide or its derivatives, nylon or glass with a salt or other derivative of tin, titanium, zirconium or iron that gives a suitable organo-metallic derivative.

It is a further object to provide a method by which such insolubilised enzyme derivatives may be regenerated (after their activity has substantially decreased) wherein an essentially similar method as the original coupling is used for the regeneration.

The present invention provides water insoluble derivatives of amylglucosidase, glucose oxidase, invertase, trypsin, α-amylase, glucose isomerase, pronase, catalase, lactate dehydrogenase or urease, chemically coupled to tin, titanium, zirconium or iron derivatives of a polysaccharide or a derivative thereof, nylon or glass.

According to the present invention, there is also provided a process for the preparation of a water insoluble enzyme which process comprises reacting the enzyme at pH 3 to 7 with a titanium, tin, zirconium or iron derivative of a polysaccharide or a derivative thereof, nylon or glass.

The reaction may be carried out at a temperature between 0 and 45° C., preferably between 0 and 20° C.

The reaction time may be between 1 minute and 18 hours, preferably between 3 hours and 18 hours.

The weight of free enzyme applied per gram of titanium, tin, zirconium or iron derivative may be between 20 and 1000 mgs., preferably between 40 and 250 mgs.

The polysaccharide may be cellulose or a derivative thereof which may be in the form of microcrystalline cellulose, diethylaminoethyl cellulose, carboxymethyl cellulose, sawdust, wood chips, filter paper or a membrane. The polysaccharide may also be cross-linked dextran or cross-linked starch.

The cellulose may be present in its crude or natural state and may be fabricated in a variety of forms such as sheets, tubes, membranes, fibres, threads or woven materials.

The enzyme may thus be chelated to a titanate, zirconate, stannate or iron complex of cellulose or a derivative thereof, still containing the requisite hydroxyl groups.

The titanium, tin, zirconium or iron derivative may be obtained by reaction of the polysaccharide derivative, nylon or glass with a salt, preferably a halide or sulphate, of the metal.

Thus cellulose may be reacted with solutions of $TiCl_4$, $TiCl_3$, $ZrCl_4$, $SnCl_4$, $SnCl_2$, $Ti_2(SO_4)_3$, $FeCl_2$, $FeCl_3$ or $FeSO_4$ or other salts of these metals and dried or stirred at temperatures between 20° and 60° C. and washed free from unreacted salts.

Microcrystalline cellulose or glass may be reacted with 12.5% w./v. titanous chloride or 15% w./v. titanic chloride and dried e.g. for 18 hours at 45° C.

Nylon may be reacted with 15% w./v. titanic chloride and dried at 45° C.

When the enzyme is amyloglucosidase, pronase, catalase, lactate dehydrogenase or glucose oxidase it may be reacted in acetate buffer at pH 4.5 with the titanium, tin, zirconium or iron derivative of the polysaccharide or a derivative thereof, nylon or glass.

When the enzyme is α-amylase it may be reacted in acetate buffer at pH 5.5 to 6.0 with the titanium, tin, zirconium or iron derivative of the polysaccharide or a derivative thereof, nylon or glass.

When the enzyme is urease it may be reacted in phosphate buffer at pH 7.0 with the titanium, tin, zirconium or iron derivative of the polysaccharide or a derivative thereof, nylon or glass.

When the enzyme is glucose isomerase it may be reacted in tris buffer at pH 7.0 with the titanium, tin, zirconium or iron derivative of the polysaccharide or a derivative thereof, nylon or glass.

When the catalytic activity of the enzyme has substantially decreased or is exhausted, the insoluble enzyme may be retreated in the same manner as the original insoluble cellulose, nylon or glass matrix was treated in preparing the insoluble enzyme.

Furthermore therefore according to the present invention there is provided a process for the regeneration of an insolubilised enzyme which process comprises reacting the spent insoluble enzyme with a salt or derivative of titanium, tin, zirconium or iron and then reacting the resulting derivative with enzyme. The salt in the regeneration process may be the same as that employed in the original preparation of the water-insoluble enzyme.

A particular merit of the present invention for providing water insoluble enzymes is that a product with a high enzymic activity, incidentally involving a high retention of the specific activity of the free enzyme, may be obtained through a single rapid process under normal reaction conditions. A second advantage is that the method may be applied in coupling a wide range of enzymes to a number of differing support materials, e.g. microcrystalline cellulose, sawdust, wood chips, filter paper, cotton wool, nylon or glass. A third advantage may be the greater heat stability of the insolubilised enzyme compared to the soluble enzyme, giving a greater shelf life, a greater retention of activity at operating temperatures and enabling use of the enzyme over an extended period. A fourth advantage is that the insolubilised enzyme may be simply regenerated when its activity has decreased to an uneconomic level by a process essentially the same as the original coupling process without degrading the original support material appreciably.

Following is a description by way of example of methods of carrying the invention into effect.

METAL SALTS EMPLOYED IN THE EXAMPLES

Titanous chloride (TiCl$_3$) was purchased as a 12.5% w./v. solution from Hopkin & Williams, technical grade. Titanic chloride (TiCl$_4$) was also technical grade obtained from BDH (BDH Chemicals Limited) as 15% w./v. solution containing 15% w./v. hydrochloric acid. Titanous sulphate (Ti$_2$(SO$_4$)$_3$) was BDH 15% w./v. solution containing 23% w./v. sulphuric acid.

Stannic chloride (SnCl$_4$.5H$_2$O), zirconium tetrachloride (ZrCl$_4$), ferrous chloride (FeCl$_2$.4H$_2$O) and ferric chloride (FeCl$_3$.6H$_2$O) were BDH of technical grade. Stannous chloride (SnCl$_2$.2H$_2$O) and ferrous sulphate $$(FeSO_4.7H_2O)$$

were BDH Analar grade.

EXAMPLE I

Titanous chloride solution (1 ml. 12.5% w./v.) was added to 100 mg. of microcrystalline cellulose (Sigmacell type 19 purchased from the Sigma (London) Chemical Co. England) in a 5 cm. diameter watch glass and mixed well for one minute. The suspension was then placed in a 45° C. oven overnight. The resulting solid was transferred to a test tube and then washed by stirring for ten minutes with acetate buffer (0.02 M, pH 4.5) (10 ml.) and centrifuging. Washing with acetate buffer was repeated a further two times after which the slurry was a cream colour.

A solution of dialysed commercial amyloglucosidase (ex *Aspergillus niger*) (Agidex, Glaxo activity 67 units/mg. protein) (1 ml.) with 4 mls. acetate buffer (0.02 M, pH 4.5) at 4° C. was added to this slurry and stirred magnetically at 0–5° C. for 18 hours. The water insoluble amyloglucosidase derivative was subjected to five cycles of washing with acetate buffer (0.02 M, pH 4.5) (10 mls.) and sodium chloride solution (1 M, 10 mls.) in the same buffer. The amyloglucosidase derivatives were finally washed twice with acetate buffer (0.02 M, pH 4.5). Further washings failed to elute any enzyme from the water insoluble amyloglucosidase derivative.

The experiment was repeated using differing concentrations of TiCl$_3$ (6.25, 2.5, 1.25% w./v.).

Amyloglucosidase activity of the water insoluble derivative was determined in the following manner. 10 ml. of soluble starch solution (1% Analar grade (BDH)) were equilibrated at 45° C. in a test tube stirred magnetically. 1 ml. of a suspension of the water insoluble derivative was added and 1 ml. samples taken at 1 minute intervals and added to tubes containing Hegedorn and Jensen reagent (Hegedorn, H. C. and Jensen, B. N., Biochem Z, *135*, 46 (1923)). Reducing sugars in the sample were determined by the method of Hegedorn and Jensen and compared to a standard curve obtained using solutions of glucose. The tangent at time zero to the curve of glucose produced against time was drawn to give the initial velocity of reaction. One unit of amyloglucosidase activity is defined as the amount of enzyme which liberates reducing sugars equivalent to 1 µmole of glucose in 1 minute at 45° C. The dry weight of the suspension of the water-insoluble derivative was determined by drying an aliquot (1 ml.) on a watch glass in an oven at 60° C. for 1 hour, cooling in a desiccator and weighing.

The protein content of the water-insoluble amyloglucosidase derivative was determined in the following manner. In a glass tube a 1 ml. sample of the suspension of the derivative used for the activity determination was added to 2 ml. of HCl (6 N). The tube was sealed and kept at 110° C. for 18 hours in an oven. The tube was then opened, the contents centrifuged and a 2 ml. sample of the supernatant pipetted into a 5 ml. sample bottle. This solution was evaporated to dryness in a vacuum desiccator and the remaining solid redissolved in 2 mls. distilled water. 0.5 ml. of this solution was placed in a test tube and 2 ml. Ninhydrin reagent added. After shaking thoroughly, the tube was placed in a boiling water bath for 20 minutes. After removal from the water bath 5 ml. of a 1:1 solution of distilled water and n-propanol were added, shaken well and allowed to stand for 18 minutes. The absorption at 570 mµ was read in a spectrophotometer (1 cm. glass cuvettes) using a blank obtained by following the same procedure with 0.5 ml. distilled water, and compared to a calibration line obtained with M/1000 solution of leucine (BDH) (Moore, S., Stein, W. H., J. Biol. Chem., *176*, 367 (1948)).

The activity and specific activity of the soluble enzyme were determined in a similar manner.

RESULTS

| Prep. No. | Salt and concentration, percent w./v. | Enzyme, units per mg. free protein | Bound protein, mg. per g. dry solid | Enzyme, units per mg. bound protein | Enzyme, units/ g. dry solid | Retention of specific activity, percent |
|---|---|---|---|---|---|---|
| 1 | TiCl$_3$ 12.5 | 67 | 147 | 31.1 | 4,570 | 46.5 |
| 2 | TiCl$_3$ 6.25 | 67 | 106 | 31.9 | 3,380 | 44 |
| 3 | TiCl$_3$ 2.5 | 67 | 88.5 | 30.3 | 2,660 | 45.5 |
| 4 | TiCl$_3$ 1.25 | 67 | 69.5 | 33.8 | 2,350 | 51.1 |

NOTE.—1 amyloglucosidase unit is taken as that which liberated 1 micromole of glucose at 45° C. in 1 minute.

EXAMPLE II

The same procedure as in Example I was used except that in place of titanous chloride solution, samples (1 ml.) of one of each of the following salts were taken at the various concentrations given: Titanic chloride (15, 7.5, 3, 1.5, 0.3 and 0.15%), titanous sulphate (15%), stannic chloride (1, 5, 10 and 20%), stannous chloride (10%), zirconium tetrachloride (1.5, 10 and 20%), ferrous chloride (0.1, 1, 5, 10 and 20%), ferric chloride (10%) and ferrous sulphate (10%).

Enzyme activities and protein contents of the water insoluble amyloglucosidase derivatives were determined in a similar manner to that described in Example I.

RESULTS

| Preparation number | Coupling salt | Salt conc., percent w./v. | Enzyme, units per g. solid | Enzyme, units/ mg. bound protein | Percent retention of specific activity |
|---|---|---|---|---|---|
| 5 | TiCl$_4$ | 15 | 3,300 | 34.5 | 52.0 |
| 6 | TiCl$_4$ | 7.5 | 3,020 | 32.5 | 49.0 |
| 7 | TiCl$_4$ | 3 | 2,800 | 30.5 | 46.0 |
| 8 | TiCl$_4$ | 1.5 | 2,600 | 30.8 | 46.5 |
| 9 | TiCl$_4$ | 0.3 | 775 | 29.2 | 43.5 |
| 10 | TiCl$_4$ | 0.15 | 665 | 48.0 | 72.5 |
| 11 | Ti$_2$(SO$_4$)$_3$ | 15 | 389 | 32.8 | 51.3 |
| 12 | SnCl$_4$ | 1 | 1,080 | 53.0 | 83.0 |
| 13 | SnCl$_4$ | 5 | 1,900 | 34.0 | 53.0 |
| 14 | SnCl$_4$ | 10 | 2,100 | 36.0 | 56.0 |
| 15 | SnCl$_4$ | 20 | 1,570 | 30.2 | 47.5 |
| 16 | SnCl$_2$ | 10 | 1,325 | 29.4 | 45.0 |
| 17 | ZrCl$_4$ | 1 | 1,680 | 36.6 | 55.0 |
| 18 | ZrCl$_4$ | 5 | 1,550 | 31.6 | 47.5 |
| 19 | ZrCl$_4$ | 10 | 1,820 | 33.8 | 51.0 |
| 20 | ZrCl$_4$ | 20 | 1,700 | 27.5 | 41.0 |
| 21 | FeCl$_2$ | 20 | 1,720 | 32.2 | 48.5 |
| 22 | FeCl$_2$ | 10 | 1,470 | 37.2 | 56.0 |
| 23 | FeCl$_2$ | 5 | 1,025 | 32.8 | 49.0 |
| 24 | FeCl$_2$ | 1 | 525 | 26.4 | 39.6 |
| 25 | FeCl$_2$ | 0.1 | 400 | 49.5 | 74.0 |
| 26 | FeCl$_3$·6H$_2$O | 10 | 1,430 | 41 | 61.5 |
| 27 | FeSO$_4$·7H$_2$O | 10 | 526 | 24.6 | 31.5 |

EXAMPLE III

The titanium derivatives of microcrystalline cellulose, prepared as in Examples I and II were stirred with various amounts of dialysed commercial amyloglucosidase (as Example I) in the range 416 to 2500 units. Otherwise the coupling and other procedures were the same as in Example I.

Enzyme activities and protein contents of the water insoluble amyloglucosidase derivatives were determined in a similar manner to that described in Example I.

RESULTS

| Preparation number | Free enzyme units applied /g. solid | Free enzyme protein applied, mgs./g. solid | Enzyme, units/g. dry solid | Enzyme, units/mg. bound protein | Percent specific activity retention |
|---|---|---|---|---|---|
| 28 | 4,160 | 62.1 | 1,895 | 30.2 | 45.5 |
| 29 | 8,350 | 124.2 | 3,340 | 40.5 | 60.5 |
| 30 | 16,700 | 248.4 | 3,920 | 30.8 | 41.5 |
| 31 | 25,000 | 373.1 | 3,250 | 27.2 | 41.0 |
| 32 | 4,160 | 62.1 | 1,270 | 27.0 | 40.5 |
| 33 | 8,350 | 124.2 | 2,550 | 36.6 | 55 |
| 34 | 16,700 | 248.4 | 2,640 | 32.2 | 48.5 |
| 35 | 25,000 | 373.1 | 2,300 | 27.8 | 41.5 |

Preps. No. 28–31 were made with derivative prepared with 15% w./v. TiCl$_4$ and Preps. No. 32–35 were made with derivative prepared with 12.5% w./v. TiCl$_3$.

EXAMPLE IV

Aliquots (1 ml.) of titanous chloride solution (12.5%) were added to four samples (100 mg.) of microcrystalline cellulose in 5 cm. diameter watch glasses and mixed well for 1 minute. One sample was then placed in a 60° C. oven, one sample in a 45° C. oven, one left at room temperature and one placed in a vacuum desiccator with sodium hydroxide pellets as desiccant. All the samples were left overnight.

Aliquots (1 ml.) of titanous chloride solution (12.5%) were added to two samples (100 mg.) of microcrystalline cellulose in test tubes. One test tube was stirred overnight at 45° C. the other was stirred overnight at room temperature.

All samples were washed, coupled with amyloglucosidase and washed again in a similar manner to that described in Example I.

Enzymic activities of the water insoluble amyloglucosidase derivatives were determined as described in Example I.

RESULTS

| Preparation number | Reaction conditions | Enzyme, units/g. solid derivative |
|---|---|---|
| 36 | Dried at 20° C | 945 |
| 37 | Dried at 45° C | 4,980 |
| 38 | Dried at 60° C | 6,230 |
| 39 | Dried under vacuum at 20° C | 1,860 |
| 40 | Stirred at 20° C | 1,410 |
| 41 | Stirred at 45° C | 1,050 |

EXAMPLE V

Insolubilised amyloglucosidase samples (100 mg.) prepared in the manner of Example II (a) with zirconium tetrachloride, (b) with stannic chloride and (c) with titanous chloride were kept under acetate buffer (0.02 M, pH 4.5) (10 ml.) at 50° C. for periods up to six days. At 24 hour intervals 0.5 ml. samples were withdrawn and assayed for enzyme activity using the determination described in Example I. A comparison was made with a sample of the soluble enzyme.

RESULTS

| Preparation number | Coupling salt | Percent of activity— | | | | | |
|---|---|---|---|---|---|---|---|
| | | 0 | 24 hrs. | 48 hrs. | 72 hrs. | 96 hrs. | 120 hrs. | 144 hrs. |
| 42 | ZrCl$_4$ | 100 | 76.5 | 70.5 | 63 | 57.5 | 56.0 | |
| 43 | SnCl$_4$ | 100 | 100 | 100 | 98 | 88.5 | | 80.5 |
| 44 | TiCl$_3$ | 100 | 95.5 | | 87 | 75 | 78.5 | 75 |
| 45 | Soluble enzyme | 100 | 93 | 81 | | 76 | | 69 |

EXAMPLE VI

An active insolubilised amyloglucosidase (activity 2000 units/g. solid) (100 mg.) suspended in 5 mls. acetate buffer (0.02 M, pH 4.5) was prepared as in Example I using TiCl$_3$ (12.5%) as the coupling salt. The derivative was separated by centrifugation and placed on a watch glass. TiCl$_3$ solution (1 ml., 12.5%) was added and the slurry mixed, and then dried overnight at 45° C. The dried solid was washed in the normal manner and the enzyme activity then determined in the normal manner. The activity at this point was zero. A sample of the derivative (35 mg.) was enzymically reactivated by addition of 1 ml. dialysed amyloglucosidase plus 4 mls. acetate buffer (0.02 M, pH 4.5). Washing was carried out as previously described and the derivative assayed for enzyme activity.

The experiment was repeated using an insoluble enzyme prepared with titanic chloride (15%) and regenerated (e) with 1 ml. titanic chloride (15%) and subsequently (b) with 1 ml. titanic chloride (7.5%). All enzyme activities and protein contents were determined by the methods described in Example I.

PREP. NO. 46

Enzyme activity units/g. derivative

| | |
|---|---|
| Initial enzyme (TiCl$_3$ coupled) | 2000 |
| After TiCl$_3$ addition | 0 |
| After regeneration | 7750 |

| Preparation number 47 | Enzyme, units/ g. solid | Bound protein, mg./g. solid | Enzyme, units per mg. bound protein | Activity retention |
|---|---|---|---|---|
| Initial enzyme (TiCl$_4$ coupled) | 2,800 | 88.5 | 31.5 | 47.0 |
| After treatment with 1 ml. TiCl$_4$ (15%) | 0 | 65.5 | | |
| After regeneration | 5,100 | 158.0 | [1] 55.0 | [1] 82.0 |
| After further treatment with 1 ml. TiCl$_4$ 7.5% | 0 | | | |
| After regeneration | 3,010 | 244.0 | [1] 35.1 | [1] 55.0 |

[1] Per mg. new bound protein.

EXAMPLE VII 100 mgs. filter paper (Whatman No. 1) was steeped in 5 ml. titanous chloride (12.5% w./v.) for 15 minutes, after which the supernatant was poured off. The paper was then dried for two hours at one of the following conditions (a) air drying at 20° C., (b) oven drying at 37° C., (c) oven drying at 60° C. After drying was complete the solid was washed by stirring in acetate buffer solution (0.02 M, pH 4.5) until the blue colour had disappeared. 1 ml. amyloglucosidase (containing 4.7 mg./ml. amyloglucosidase, specific activity 74 units/mg. protein) was added at 4° C. and then left overnight at 4° C. The coupled amyloglucosidase was washed with buffer and salt solution in a similar manner to previous examples. All enzyme activities and protein contents were determined by the methods described in Example I.

RESULTS

| Preparation number | Temp. of drying, °C. | Total activity, units/g. solid | Specific acitivity, units/mg. | Percent retention of specific activity |
|---|---|---|---|---|
| 48 | 20 | 127 | 27.0 | 36.5 |
| 49 | 37 | 165 | 17.9 | 24.6 |
| 50 | 60 | 113 | 17.9 | 24.6 |

EXAMPLE VIII 100 mgs. of (a) wood flour (obtained from H. Richardson & Sons Ltd., Marlow, Bucks, size range 100–300μ) or (b) sawdust (obtained from M. Richardson & Sons Ltd., size range 250–800μ) or (c) cotton wool (white non-absorbent from Fisons Scientific Apparatus, Loughborough) were activated in a similar manner to that described in Example I with titanous chloride 12.5% w./v. Each sample was then steeped at 4° C. with 1.0 ml. amyloglucosidase solution (activity 74 units/mg. protein, 4.7 mg./ml.).

The insoluble amyloglucosidase was washed in a similar manner to that previously described. All enzyme activities and protein contents were determined by the methods described in Example I.

RESULTS

| Preparation number | Solid support | Total activity, units/g. solid | Bound protein, mg./g. solid | Percent, specific activity retention |
|---|---|---|---|---|
| 51 | Wood flour | 239 | 8.1 | 40.0 |
| 52 | Sawdust | 165 | 4.6 | 48.5 |
| 53 | Cotton wool | 192 | 4.0 | 48.0 |

EXAMPLE IX

Titanic chloride solution (1 ml., 15%) was added to 100 mg. nylon fibres (nylon 66 from I.C.I. (Fibres) Ltd., Pontypool) in a 5 cm. diameter watch glass and mixed well for one minute. The suspension was dried in a 45° C. oven overnight, after which the dry powder was washed three times with acetate buffer (0.02 M, pH 4.5) (10 ml.) and separated by centrifugation.

An insoluble amyloglucosidase was prepared from this solid by the method given in Example I. The example was repeated using 1 ml. of 7.5% titanic chloride solution.

Enzymic activity of each water-insoluble amyloglucosidase derivative was determined by the method described in Example I.

RESULTS

| Preparation number | TiCl$_4$ conc., w./v. | Total activity of insoluble enzyme, units/g. solid |
|---|---|---|
| 54 | 15 | 2,780 |
| 55 | 7.5 | 1,525 |

EXAMPLE X

Titanic chloride solution (1 ml. or 0.5 ml., 15%) or titanous chloride (1 ml., 12.5%) or stannic chloride (1 ml., 10%) was added to 100 mg. powdered Pyrex glass in a 5 cm. diameter watch glass and mixed well for one minute. A similar procedure was thereafter followed to produce an insolubilised amyloglucosidase as described in Example I. The experiment was repeated with a sample of soda glass in the form of spheroidal particles 105 microns average diameter, using titanic chloride (1 ml., 15%) or titanous chloride (1 ml., 12.5%).

Enzymic activity and protein contents of the water insoluble amyloglucosidase derivatives were determined by the methods described in Example I.

RESULTS

| Prep. No. | Glass type | Reaction mixture | Bound protein conc., mg./g. solid | Total activity, units/g. solid | Specific activity, percent retention |
|---|---|---|---|---|---|
| 56 | Pyrex | 1 ml., 15% TiCl$_4$ | | 2,790 | |
| 57 | do | 1 ml., 12.5% TiCl$_3$ | 68.5 | 2,300 | 50.5 |
| 58 | do | 0.5 ml., 15% TiCl$_4$ | 79 | 2,860 | 49.2 |
| 59 | do | 1 ml., 10% SnCl$_4$ | 29.6 | 1,090 | 47.2 |
| 60 | Soda | 1 ml., 15% TiCl$_4$ | | 730 | |
| 61 | do | 1 ml., 12.5% TiCl$_3$ | | 490 | |

EXAMPLE XI

Three samples (100 mg.) of microcrystalline cellulose (19μ) were activated with titanous chloride (12.5%) in the manner described in Example I. The solid derivatives thus obtained were contacted with solutions of amyloglucosidase (activity 390 units/ml.) in a manner similar to that described in Example I except that the contact times used were (a) 3 hours, (b) 18 hours and (c) 42 hours. Washing and assay procedures were in the manner described in Example I.

RESULTS

| Preparation number | Time of coupling (hours) | Total activity of water insoluble amyloglucosidase derivative, units/g. solid |
|---|---|---|
| 62 | 3 | 1,000 |
| 63 | 18 | 1,010 |
| 64 | 42 | 820 |

EXAMPLE XII

Two samples of microcrystalline cellulose (19μ, 100 mg.) were activated in a manner similar to that described in Example I using titanic chloride solution (1 ml., 15%). The solid derivatives thus obtained were contacted with identical solutions of amyloglucosidase (activity 780 units/ml.) in a manner similar to that described in Example I. Sample (a) was contacted at 20° C. for 18 hours and sample (b) at 2° C. for 18 hours.

Washing and assay methods were as described heretofore.

RESULTS

| Preparation number | Temp. of coupling, °C. | Enzyme, units/ g. dry solid | Enzyme, units/ mg. bound protein |
|---|---|---|---|
| 65 | 20 | 2,100 | 30.5 |
| 66 | 2 | 2,300 | 35.5 |

EXAMPLE XIII

Samples (100 mg.) of microcrystalline cellulose (19μ) were activated in a manner similar to that described in Example I with titanic chloride solution (1 ml., 15%). After washing the metal derivatives of cellulose thus obtained in the manner described in Example I, the final washings were discarded and the solid resuspended in samples (1 ml.) of the following buffer solutions (a), (b) and (c): Acetate buffer (0.02 M, pH 3.5, 4.2 and 4.9 respectively), (d) phosphate buffer (0.02 M, pH 6.8) and borate (0.02 M, pH 8.5). These suspensions were contacted with samples (1 ml.) of amyloglucosidase (containing 10 mg. protein, 780 units of activity) in each of the same buffers as described above, for 18 hours at 0–4° C. Washing and resuspension was then carried out in the manner described in Example I, with the washing solutions there described, and the activity of the water insoluble amyloglucosidase derivative measured in the manner previously described.

RESULTS

| Preparation number | pH of coupling | Total activity of water insoluble enzyme obtained, units/g. solid |
|---|---|---|
| 67 | 3.5 | 1,800 |
| 68 | 4.2 | 2,050 |
| 69 | 4.9 | 2,300 |
| 70 | 6.8 | 1,600 |
| 71 | 8.5 | 1,610 |

EXAMPLE XIV

Titanous chloride solution (1 ml., 12.5%) was added to 100 mg. of microcrystalline cellulose (Sigma Cell type 38) in a 5 cm. diameter watch glass and mixed well for one minute. The suspension was then placed in a 45° C. oven overnight. The resulting solid was transferred to a test tube and then washed by stirring for ten minutes with acetate buffer (0.02 M, pH 4.5) (10 ml.) and centrifuging. Washing with acetate buffer (0.02 M, pH 4.5) (10 ml.) was repeated twice.

A solution of pronase (10 mg./ml.; 1 ml.) from Koch-Light Laboratories Ltd., Colnbrook, Bucks, England with 4 mls. acetate buffer (0.02 M, pH 4.5) at 4° C. was added to this slurry and stirred magnetically for 18 hours. The water insoluble pronase derivative was subjected to five cycles of washings with acetate buffer (0.02 M, pH 4.5) (10 mls.) and sodium chloride solution (1 M, 10 mls.) in the same buffer. The pronase derivative was finally washed twice with acetate buffer (0.02 M, pH 4.5) (10 mls.).

A control experiment was performed in which a similar aliquot of pronase was contacted with cellulose (100 mg.) alone instead of the cellulose-titanium complex. The enzyme activity of both preparations were assessed by a modification of the method of Y. Narahashi [Methods in Enzymology, 19 (1970), 651] using casein as a substrate. Each preparation (100 mg.) suspended in 0.02 M acetate buffer pH 4.5 (2 mls.) at 40° C. was stirred with an aliquot of casein solution (2 mls.; in 0.1 M phosphate buffer pH 6.5) also at 40° C. This combination gives a pH of 5.8. After ten minutes, 0.11 M trichloracetic acid (4 ml.) in 0.22 M ammonium acetate/0.33 M acetic acid was added to each suspension and after centrifuging the optical density of the supernatant measured at 275 m$\mu$. The supernatants from the insoluble pronase preparations after such incubation showed OD 275 m$\mu$ of 0.370 (cellulose-titanium-pronase) compared with 0.170 (cellulose-pronase) and a reagent blank of 0.125. These activities measured at pH 5.8 remained virtually constant after two further washings with 0.02 M acetate buffer pH 4.5 and the washings exhibited no activity.

EXAMPLE XV

Batches (100 mg.) of the cellulose-titanium complex were prepared as in Example XIV. A suspension (16 mg./ml.; 1 ml.) of lactate dehydrogenase (150 $\mu$./mg.) from beef heart from Koch-Light Laboratories Ltd. was mixed with 4 mls. acetate buffer (0.02 M, pH 4.5) at 4° C. and was added to the cellulose-titanium complex (100 mg.) and stirred magnetically for 18 hours. The water insoluble lactate dehydrogenase preparation was then washed by the procedure outlined in Example XIV. A control experiment was performed in which a similar aliquot of lactate dehydrogenase was contacted with cellulose (100 mg.) alone instead of the cellulose-titanium complex.

Each preparation (100 mg.) was suspended in 0.02 M acetate buffer pH 4.5 (1 ml.), sodium pyruvate 1 mM. solution (1 ml.) and reduced nicotinamide adenine dinucleotide sodium salt (3.9 mg./ml.) (0.01 ml.) added and the whole incubated at 23° C. for 15 minutes. After centrifuging, the optical densities of the supernatants were measured at 340 m$\mu$. The supernatant from the insoluble lactate dehydrogenase preparations showed $OD_{340}$ of 0.150 (cellulose-titanium-lactate dehydrogenase) compared with 0.700 (cellulose-lactate dehydrogenase) and a reagent blank of 1.12. The activities measured at pH 4.5 remained virtually constant after two further washings with 0.02 M sodium acetate buffer pH 4.5, and the washings exhibited no activity.

EXAMPLE XVI

Batches (100 mg.) of cellulose-titanium complex were prepared as in Example XIV. A suspension (20 mg./ml.; 1 ml.) of catalase (3750 units/mg., cryst.) from beef liver from Koch-Light Laboratories Ltd. was mixed with 4 mls. acetate buffer (0.02 M, pH 4.5) at 4° C. and was added to the celulose-titanium complex (100 mg.) and stirred magnetically for 18 hours. The water insoluble catalase preparation was then washed by the procedure outlined in Example XIV. A control experiment was performed in which a similar aliquot of catalase was contacted with cellulose (100 mg.) alone instead of cellulose-titanium complex.

Each preparation (100 mg.) was suspended in distilled water (1.0 ml.) and 0.2% hydrogen peroxide (5.0 mls.) and 0.02 M acetate buffer (pH 4.5 4.0 ml. were added. Aliquots (1.0 ml.) were removed after 1–10 minutes and immediately mixed with sulphuric acid-trichloroacetic acid mixture (0.2 ml.), prepared by the dissolution of trichloroacetic acid (TCA) (40 g.) in water to give 100 ml. of solution to which concentrated sulpeuric acid (17 ml.) was subsequently added. Samples were then mixed with 10% potassiom iodide (1.0 ml.) and left in the dark for 15 minutes. The liberated iodine was titrated against sodium thiosulpate (N/100), using starch as indicator. The results are given in tabular form below. A blank titration was also carried out using distilled water, but no enzyme, and gave a value of 6.20 ml.

RESULTS

| Time (mins.) | Titration value (ml.) | |
|---|---|---|
| | Cellulose-titanium-catalase | Cellulose-catalase |
| 1 | 4.90 | 6.10 |
| 2 | 4.00 | 6.10 |
| 3 | 3.00 | 6.00 |
| 4 | 2.10 | 5.90 |
| 5 | 1.50 | 5.80 |
| 10 | 1.40 | 5.70 |

EXAMPLE XVII

Titanic chloride solution (1 ml., 15%) was added to 100 mg. of microcrystalline cellulose (19$\mu$) in a 5 cm. diameter watch glass and mixed well for one minute. The suspension was dried overnight at 45° C. The resulting solid was transferred to a test tube and washed by stirring for 10 minutes with acetate buffer (0.02 M, pH 6.0) (10 ml.) and centrifuging. This washing was repeated a further two times.

A solution of $\alpha$-amylase (3.2 mg. protein/ml.; 1 ml.) (bacterial amylase Novo liquid "BANL" 120, Globe Products Ltd., Accrington, England) with 4 mls. acetate buffer (0.02 M, pH 6.0) was added to this slurry and stirred for 18 hours at 4° C. The water insoluble $\alpha$-amylase derivative was subjected to five cycles of washing with acetate buffer (pH 6.0, 0.02 M) (10 mls.) and sodium chloride solution (M, 10 mls.) in the same buffer, before two final washes with acetate buffer (0.02 M, pH 6.0). The activity of the water insoluble $\alpha$-amylase was determined in the following manner. 1 ml. of suspension was incubated at 30° C. for 3 minutes with 1 ml. of a previously equilibrated solution of soluble starch (1%) in acetate buffer (pH 5.5). 3.5-dinitrosalicylate reagent (2 ml., made from the acid (1 g.) dissolved in a mixture of NaOH (2 N, 20 ml.) and water (50 ml.) containing Rochelle salt (30 g.), the whole diluted to 100 ml. with water) was added and the tube placed in a boiling water bath for 10 minutes. After rapid cooling, the contents of the tube were centrifuged and the optical density of the supernatant read at 520 m$\mu$ against a blank prepared as above but containing acetate buffer in place of the enzyme. One $\alpha$-amylase unit was defined as the amount of enzyme required to liberate reducing sugar euivalent to 1 mg. maltose in 3 minutes at 30° C., pH 5.5.

RESULT

Prep. No. _____ 72
Bound protein, mg./g. solid _____ 1.01
Total $\alpha$-amylase activity of insoluble derivative, units/g. solid _____ 170

EXAMPLE XVIII

A titanium cellulose derivative (100 mg.) was prepared in the manner described in Example XVII.

A solution of glucose isomerase (1 ml., crude cell free, ex. *Lactobacillus brevis*) (containing 578 mg. protein) in tris buffer (4 ml., 0.02 M, pH 7.0) was added to a slurry of this derivative and stirred for 18 hours at 4° C. The water insoluble glucose isomerase derivatives were subjected to a similar washing procedure to that described in Example XVII, using tris buffer (0.02 M, pH 7.0) in place of acetate buffer, and the activity of the derivative determined in the following manner: A 1 ml. sample of enzyme suspension was incubated with 2.4 ml. tris buffer (0.05 M, pH 7.0), and 0.6 ml. of a solution of $MnSO_4$ ($10^{-2}$ M) and $CoCl_2$ ($10^{-3}$ M) in water, for 10 minutes at 40° C. Glucose solution (Analar, 2 M in water, 2 ml.) was added and reacted at 50° C. in a water bath with stirring. Samples (1 ml. or 4 ml.) were taken at 30 minutes, 60 minutes and 120 minutes, and the reaction stopped by the addition of TCA solution (10%, 0.067–0.27 ml.). Solids were allowed to settle and the supernatant removed and suitably diluted in the same buffer.

1 ml. samples of these supernatants were taken and assayed for fructose by a modification of the method of Yaphe and Arsenoult (Yaphe, W. and Arsenoult, G. P., Anal. Biochem. *13*, 143 (1965)). One unit of glucose isomerase activity was defined as the amount of enzyme required to produce 1 μmole of fructose from glucose in 30 minutes under the conditions of assay.

RESULT

Prep. No. _____ 73
Bound protein, mg./g. solid _____ 21.3
Total glucose isomerase activity of insoluble derivative, units/g. solid _____ 1169

EXAMPLE XIX

A titanium cellulose derivative (100 mg.) was prepared in the manner described in Example XVII and washed further with two washes of phosphate buffer (pH 7.0, 0.02 M).

A solution of urease (30 mg. ex jack beans, nominal 2800 units/g. from Sigma (London) Chemical Co.) in phosphate buffer (5 ml.) (0.02 M, pH 7.0) was added to a slurry of the derivative and stirred for 18 hours at 4° C. The water insoluble urease derivatives were subjected to washing with phosphate buffer (10 ml.) (0.02 M, pH 7.0) 4 times, after which no enzyme could be detected in the washings, and the urease activity of the water insoluble derivative determined in the following manner. Urea (1 ml. 3%) was added to the urease suspension (1 ml.) and stirred at 30° C. for 5 minutes in a test tube, after which sodium phenate (2 ml.) was added, and the sample suitably diluted in buffer. Ammonia in this sample was determined by the method of Fawcett and Scott (Fawcett, J. K., and Scott, J. E., J. Clin. Path., *13*, 156, 1960). 1 unit of urease activity was defined as that amount which produces 1 mg. of ammonia nitrogen in 5 minutes at 30° C., pH 7.0.

RESULT

Prep. No. _____ 74
Bound protein, mg./g. solid _____ 10.2
Total activity of insoluble urease derivative, units/g. _____ 32.2

EXAMPLE XX

A microcrystalline cellulose-titanium derivative (100 mg.) was prepared in the manner described in Example XVII. A solution of glucose oxidase (2 mg.) (Grade II from Boehringer-Mannheim 20 units/mg.) in phosphate buffer (2 ml., 0.1 M, pH 4.5) was added to a slurry of this derivative and stirred for 3 hours at 4° C. The water insoluble glucose oxidase derivative was subjected to five cycles of washing with phosphate buffer (10 ml., 0.1 M, pH 5.1) and sodium chloride (0.5 M) in the same buffer (10 ml.), followed by two washes with phosphate buffer (10 m., 0.1 M, pH 5.1). The water insoluble glucose oxidase derivative was resuspended in the same buffer (2 ml.) and assayed for activity in the following manner. A mixture of ABTS (ammonium 2,2'-azo-di-(3-ethylbenzthiazolin-6-sulphonate) (Boehringer-Mannheim) solution (0.5 g./l.) in phosphate buffer (0.1 M, pH 7.0) (25 ml.) was equilibrated in a flask at 25° C. A solution of peroxidase (Grade II from Boehringer-Mannheim, 2 mg./ml.) in phosphate buffer (100 μl., 0.1 M, pH 7.0) was added and the optical density of the reaction mixture determined at 415 mμ on a Unicam SP 500 spectrophotometer. An aliquot (100 μl.) of the water insoluble glucose oxidase derivative was added and after stirring at 25° C. for five minutes, the reaction was arrested by rapid centrifugation. Optical densities of the supernatants were immediately read at 415 mμ. ΔE/min. was determined and the activity calculated from the equation:

Total glucose oxidase activity units/g. dry material $$=\frac{\Delta E/\text{min.} \times 30.2}{38 \times w}$$

where $w$=dry weight of derivative in sample as determined by the method described in Example I.

RESULT

| Preparation number | Total glucose oxidase activity of water insoluble derivative, units/g. solid |
|---|---|
| 75 | 176 |

EXAMPLE XXI

A microcrystalline cellulose-titanium derivative (1 g.) was prepared in a similar manner to that described in Example XVII. A solution of trypsin (crude, *ex*-pancreas; 500 mg.) in succinate buffer (0.1 M, pH 5.0, 10 ml.) was added to a slurry of this derivative and stirred at 4° C. for 18 hours. The water insoluble trypsin derivative was washed in a similar manner to that described in Example XX, substituting succinate buffer (0.1 M, pH 5.0) for phosphate buffer, wherever used. The activity of the water insoluble trypsin derivative was determined in the following manner. A suspension (2 ml.) of the derivative was mixed with 2% albumin (2 ml.) at 30° C. and incubated for 10 minutes. Trichloroacetic acid (5%, 5 ml.) was added, and the contents allowed to settle. To an aliquot (2 ml.) of the supernatant was added 0.5 M sodium hydroxide (4 ml.) and standard Folin phenol reagent diluted with 2 volumes of water (1.2 ml.). The optical density was determined at 700 mμ. One unit of trypsin activity was defined as that amount of enzyme which yielded a solution with an optical density at 700 mμ of 1.0 under the conditions of the assay.

RESULT

| Preparation number | Total trypsin activity of water insoluble derivative, units/g. solid |
|---|---|
| 76 | 737 |

EXAMPLE XXII

A microcrystalline cellulose titanium derivative (1 g.) was prepared in a similar manner to that described in Example XVII. A solution of invertase (*ex*. baker's yeast; 100 mg.) in succinate buffer (0.1 M, pH 5.0; 10 ml.) was added to a slurry of this derivative and stirred at 4° C. for 18 hours. The water insoluble invertase derivative was washed in a similar manner, and with the same buffers, as in Example XXI, and the activity of the derivative calculated from the determination of reducing sugars liberated from a 1% sucrose solution in succinate buffer (0.1 M, pH 5.0) at 55° C. One unit of invertase activity was defined as that amount which liberates 1 μmole of glucose from sucrose in one minute at 55° C. and pH 5.0.

RESULT

| Preparation number | Total net invertase activity of water insoluble derivative, units/g. solid |
|---|---|
| 77 | 745 |

EXAMPLE XXIII

Preparation of enzyme-immobilised membranes, using titanous chloride

Two pieces of dialysis membrane (5 x 5 cm.) previously boiled in water were steeped in titanous chloride solution (12.5% w./v.) overnight at room temperature with stirring. Both were then washed in acetate buffer (50 ml., 0.02 M, pH 4.5, then 2× 25 ml.). One membrane was then immersed in a solution of glucose oxidase (Grade II from Boeringer-Mannheim, 4 ml. at 4.2 mg./ml.) in acetate buffer (0.02 M, pH 4.5) whilst the other was mounted in a Perspex cell. One side of this membrane (to be the enzyme coated side) was then exposed to a solution of amyloglucosidase (Agidex 3000, Glaxo ex. *A. niger*). This solution of amyloglucosidase had been prepared by dialysis of a crude extract first against water then against acetate buffer (0.02 M, pH 4.5).

After standing overnight at 4° C. both membranes were thoroughly washed in a similar acetate buffer (6× 50 ml.) before subsequent use.

The glucose oxidase membrane was placed in a clean dry test-tube and tris-buffer (2-amino-2-hydroxymethyl-propane-1,3-diol) (100 μl., 0.5 M, pH 7.0) was added. An aliquot (1000 μl.) of a solution of glucose in tris buffer (0.5 M, pH 7.0) was then added, the solution and membrane were shaken well, and then left to stand at 37° C. for 30 minutes. After this incubation period an aliquot (500 μl.) was removed from the test-tube and added to a solution of ABTS, ammonium 2,2'-azo-di-(3-ethylbenz-thiazolin-6-sulphonate), Boehringer-Mannheim, 2,500 μl. of 500 mg./litre in tris buffer (0.5 M, pH 7.0) and peroxidase (50 μl. of 2 mg./ml. in tris buffer 0.5 M, pH 7.0). The solution was shaken well and the absorbance at 415 mμ was recorded. Comparison with a standard sample of glucose oxidase demonstrated that the membrane was as active as 4.6 μg. glucose oxidase.

EXAMPLE XXIV

Hydrolysis of starch and simultaneous fractionation by the membrane prepared in Example XXIII The amyloglucosidase membrane was mounted in a perspex flow cell and the enzyme side of the membrane was exposed to a previously dialysed solution of starch in acetate buffer (0.02 M, pH 4.45; 102 μg./ml.). The other side of the membrane was in contact with buffer only. After incubation for 30 minutes at 37° C. this buffer solution was analysed for glucose using Technicon Autoanalyser equipment.

A sharp rise in glucose concentration was recorded which decreased to a steady value as fresh buffer solution was drawn into the cell. The trace indicated that at "steady-state conditions" the cell was producing glucose at a rate of 0.3 μg./ml.

EXAMPLE XXV

The application of a water insoluble amyloglucosidase particulate derivative to continuous starch hydrolysis A sample (1.3 g.) of a water insoluble derivative of amyloglucosidase was produced using microcrystalline cellulose, titanic chloride (15%) and amyloglucosidase (Agidex 3000, Glaxo) by a similar method to those generally described in Examples I and II. This was applied to the hydrolysis of a 5% starch hydrolysate in acetate buffer (0.1 M, pH 4.5) continuously over a period of 8 days in an upflow fluid bed reactor. This reactor consisted of a jacketed tube (12.5 mm. internal diameter), two metres high with the feed pumped through a peristaltic pump to the base of the tube. The bed of water insoluble amyloglucosidase particles was kept in a fluidised state by the upflow of solution and no bed support was required. The temperature of the tube was maintained constant by thermostatic control of the water jacket surrounding it. After an initial period during which some loss of fines occurred, the bed achieved a definable depth of approx. 100–110 cms, with a sharp interface between the reacting fluid bed and the clear liquid product. Samples taken at 24 hour intervals were analysed for reducing sugars by the method of Hegedorn and Jensen (Hegedorn, H. C., and Jensen, B. N. Biochem Z. *135*, 46 (1923)) and the results expressed in terms of dextrose equivalents for the feed and product.

RESULTS

| Time, days | Flow rate, ml./min. | Height of bed (cms.) | Dextrose Equivalents, percent inlet | outlet |
|---|---|---|---|---|
| 0 | 5.2 | 110 | 42.0 | 79.6 |
| 1 | 4.2 | 120 | 39.0 | 79.2 |
| 2 | 3.4 | 115 | 37.6 | 82.0 |
| 3 | 2.9 | 132 | 37.6 | 81.2 |
| 4 | 2.0 | 100 | 41.0 | 91.6 |
| 5 | 2.0 | 103 | 38.4 | 94.4 |
| 6 | 2.0 | 106 | 37.4 | 87.2 |
| 7 | 2.0 | 108 | 35.8 | 85.8 |
| 8 | 2.1 | 115 | 33.2 | 82.2 |

Initial activity of total reactor bed was equivalent to 1660 units.

EXAMPLE XXVI

Samples (100 mg.) (a) of microcrystalline cellulose (19μ), (b), carboxymethyl cellulose, fine mesh, capacity 0.72 meq./g. from Sigma (London) Chemical Co. and (c) diethyl-amino-ethyl (DEAE) cellulose, fine mesh, capacity 0.90 meq./g. from Sigma (London) Chemical Co. were activated in a manner similar to that described in Example I using titanic chloride solution (1 ml.; 15%). The solid derivatives thus obtained were contacted with solutions of amyloglucosidase (Grade II ex-Rhizopus genus mold from Sigma (London) Chemical Co., 10 mg.) in acetate buffer (1 ml.; 0.02 M, pH 4.5) in a manner similar to that described in Example I.

Washing and assay methods of the water insoluble amyloglucosidase derivatives were as described heretofore. Amyloglucosidase units as defined in Example I.

RESULTS

| Preparation number | Solid support | Bound protein, mg./g. solid | Total activity of derivative, units/g. solid |
|---|---|---|---|
| 78 | Microcrystalline cellulose | 27.40 | 745 |
| 79 | Carboxymethyl cellulose | 30.80 | 545 |
| 80 | DEAE cellulose | 7.80 | 311 |

EXAMPLE XXVII

Cross linked dextran (Sephadex G.25, fine; Pharmacia (G.B) Ltd., London, England) (100 mg.) was mixed with titanic chloride solution (1 ml., 15%). Thereafter the procedure described in Example XVII was followed, for the production of a water insoluble bacterial α-amylase derivative. Acetate buffers used throughout were 0.02 M, pH 5.5.

The activity, dry weight and protein content of the water insoluble α-amylase was determined in the manner described in Example XVII.

RESULT

Prep. No. _____ 81
Mgs. free protein applied/g. solid _____ 636
Mgs. bound protein/g. solid _____ 73.0
Total α-amylase activity of water insoluble derivative, units/g. _____ 307

EXAMPLE XXVIII

A water insoluble starch derivative was prepared by slurrying soluble starch (100 g.) in ethanol (500 ml.) containing sodium hydroxide (3 g.) and cross-linking with epichlorohydrin (39.8 g.). This slurry was stirred at room temperature for 16 hours, neutralized with sulphuric acid and filtered. The solid was washed with water:methanol (1:1 w./v.; 3× 400 ml.) and with methanol (2× 400 ml.) and dried *in vacuo* at 45° C. A sample (100 mg.) of the resultant powder was mixed with titanic chloride (1 ml.; 15%) and thereafter the procedure described in Example XVII was followed for the production of a water insoluble derivative of a bacterial α-amylase. Acetate buffers used throughout were 0.02 M, pH 5.5.

The activity, dry weight, and protein content of the water insoluble α-amylase derivative were determined in the manner described in Example XVII.

RESULT

| | |
|---|---|
| Prep. No. | 82 |
| Mgs. free protein applied/g. solid | 636 |
| Mgs. bound protein/g. solid | 316 |
| Total α-amylase activity of water insoluble derivative, units/g. solid | 727 |

We claim:

1. A process for the preparation of a water-insoluble, active enzyme which process comprises reacting a polysaccharide, nylon, glass or a polysaccharide derivative selected from the group consisting of microcrystalline cellulose, diethylaminoethyl cellulose, carboxymethy cellulose, sawdust, wood chips, paper, cotton, cross-linked dextran and cross-linked starch with an aqueous solution of a metal salt selected from the group consisting of the halides and sulfates of titanium, tin, zirconium or iron to form a mixture, thereafter drying the resulting mixture at a temperature of about 20° C–60° C., washing the resulting metallic derivative free from unreacted salts, and reacting the metallic derivative with said enzyme at pH 3 to 7 at a temperature not below about 0° C. and not so high as to inactivate the enzyme.

2. A process as claimed in claim 1 wherein the weight of free enzyme applied per gram of metallic derivative is between 40 and 250 mgs.

3. A process as claimed in claim 1 wherein cellulose is reacted with a solution of $TiCl_4$, $TiCl_3$, $ZrCl_4$, $SnCl_4$, $SnCl_2$, $Ti_2(SO_4)_3$, $FeCl_2$, $FeCl_3$ or $FeSO_4$.

4. A process as claimed in claim 1 wherein microcrystalline cellulose, nylon or glass is reacted with 12.5% w./v. titanous chloride or 15% w./v. titanic chloride and dried at 45° C.

5. A process as claimed in claim 1 wherein the enzyme is amyloglucosidase, pronase, catalase, lactate dehydrogenase, glucose oxidase or α-amylase and is reacted in acetate buffer at pH 4.5 to 6.0.

6. A process as claimed in claim 1 wherein the enzyme is urease which is reacted in phosphate buffer at pH 7.0.

7. A process as claimed in claim 1 wherein the enzyme is glucose isomerase which is reacted in tris buffer at pH 7.0.

8. A process as claimed in claim 1, wherein said enzyme is amyloglucosidase, glucose oxidase, invertase, trypsin, α-amylase, glucose isomerase, pronase, catalase, lactate dehydrogenase or urease.

9. A process for the regeneration of an insolubilized enzyme prepared with microcrystalline cellulose or glass by the process claimed in claim 1 and wherein the insolubilized enzyme has become spent through use, which comprises reacting the spent insoluble enzyme with a metal salt as defined in claim 1 and then reacting the resulting metallic derivative with fresh enzyme as described in claim 1.

10. A process according to claim 1 wherein the resulting metallic derivative is reacted with said enzyme at a temperature between 0° and 45° C.

11. A water-insoluble enzymatically active preparation of an enzyme chemically coupled with a tin, titanium, zirconium or iron derivative of nylon or glass prepared according to the process of claim 1.

12. A water-insoluble enzymatically active preparation according to claim 11 wherein said enzyme is amyloglucosidase, glucose oxidase, invertase, trypsin, α-amylase, glucose isomerase, pronase, catalase, lactate dehydrogenase or urease.

13. A process for the preparation of a water-insoluble active enzyme which process comprises reacting a polysaccharide, nylon, glass or a polysaccharide derivative selected from the group consisting of microcrystalline cellulose, diethylaminoethyl cellulose, carboxymethy cellulose, sawdust, wood chips, paper, cotton, cross-linked dextran and cross-linked starch with an aqueous solution of a metal salt selected from the group consisting of the halides and sulfates of titanium, tin, zirconium or iron to form a mixture, thereafter stirring the resulting mixture at a temperature of about 20° C–60° C., washing the resulting metallic derivative free from unreacted salts, and reacting the metallic derivative with said enzyme at pH 3 to 7 at a temperature not below about 0° C. and not so high as to inactivate the enzyme.

14. A process as claimed in claim 3 wherein said enzyme is amyloglucosidase, glucose oxidase, invertase, trypsin, α-amylase, glucose isomerase, pronase, catalase, lactate dehydrogenase or urease.

15. A process according to claim 13, wherein the resulting metallic derivative is reacted with said enzyme at a temperature between 0° and 45° C.

16. A water-insoluble enzymatically active preparation of an enzyme chelated to a titanate, zirconate, stannate or iron complex of a polysaccharide or a polysaccharide derivative selected from the group consisting of microcrystalline cellulose, diethylaminoethyl cellulose, carboxymethy celuose, saw dust, wood chips, paper, cotton, cross-inked dextran and cross-linked starch.

17. Enzymatically active amyloglucosidase chelated to a titanate, zirconate, stannate or iron complex of a polysaccharide or a polysaccharide derivative selected from the group consisting of microcrystalline cellulose, diethylaminoethyl cellulose, carboxymethyl cellulose, saw dust, wood chips, paper, cotton, cross-linked dextran and cross-linked starch.

18. Enzymatically active glucose oxidase chelated to a titanate, zirconate, stannate or iron complex of a polysaccharide or a polysaccharide derivative selected from the group consisting of microcrystallnie cellulose, diethylaminoethyl cellulose, carboxymethyl celuose, saw dust, wood chips, paper, cotton, cross-linked dextran and cross-linked starch.

19. Enzymatically active invertase chelated to a titanate, zirconate, stannate or iron complex of a polysaccharide or a polysaccharide derivative selected from the group consisting of microcrystalline cellulose, diethylaminoethyl cellulose, carboxymethyl cellulose, saw dust, wood chips, paper, cotton, cross-linked dextran and cross-linked starch.

20. Enzymatically active trypsin chelated to a titanate, zirconate, stannate or iron complex of a polysaccharide or a polysaccharide derivative selected from the group consisting of microcrystalline cellulose, diethylaminoethyl cellulose, carboxymethyl cellulose, saw dust, wood chips, paper, cotton, cross-linked dextran and cross-linked starch.

21. Enzymatically active α-amylase chelated to a titanate, zirconate, stannate or iron complex of a polysaccharide or a polysaccharide derivative selected from the group consisting of microcrystalline celuose, diethylaminoethyl cellulose, carboxymethyl cellulose, saw dust, wood chips, paper, cotton, cross-linked dextran and cross-linked starch.

22. Enzymatically active glucose isomerase chelated to a titanate, zirconate, stannate or iron complex of a polysaccharide or a polysaccharide derivative selected from the group consisting of microcrystalline cellulose, diethylaminoethyl cellulose, carboxymethyl cellulose, saw dust, wood chips, paper, cotton, cross-linked dextran and cross-linked starch.

23. Enzymatically active pronase chelated to a titanate, zirconate, stannate or iron complex of a polysaccharide or a polysaccharide derivative selected from the group consisting of microcrystalline cellulose, diethylaminoethyl cellulose, carboxymethyl cellulose, saw dust, wood chips, paper, cotton, cross-linked dextran and cross-linked starch.

24. Enzymatically active catalase chelated to a titanate, zirconate, stannate or iron complex of a polysaccharide or a polysaccharide derivative selected from the group consisting of microcrystalline cellulose, diethylaminoethyl cellulose, carboxymethyl cellulose, saw dust, wood chips, paper, cotton, cross-linked dextran and cross-linked starch.

25. Enzymatically active lactate dehydrogenase chelated to a titanate, zirconate, stannate or iron complex of a polysaccharide or a polysaccharide derivative selected from the group consisting of microsrystalline cellulose, diethylaminoethyl cellulose, carboxymethyl cellulose, saw dust, wood chips, paper, cotton, cross-linked dextran and cross-linked starch.

26. Enzymatically active urease chelated to a titanate, zirconate, stannate or iron complex of a polysaccharide or a polysaccharide derivative selected from the group consisting of microcrystalline cellulose, diethylaminoethyl cellulose, carboxymethyl cellulose, saw dust, wood chips, paper, cotton, cross-linked dextran and cross-linked starch.

References Cited

Weliky et al.: The Chemistry and Use of Cellulose Derivatives for the Study of Biological Systems, Immunochemistry, vol. 2, 1965 (pp. 293, 300, 302 and 305).

DAVID M. NAFF Primary Examiner

U.S. Cl. X.R.

195—68, Dig. 11